UNITED STATES PATENT OFFICE.

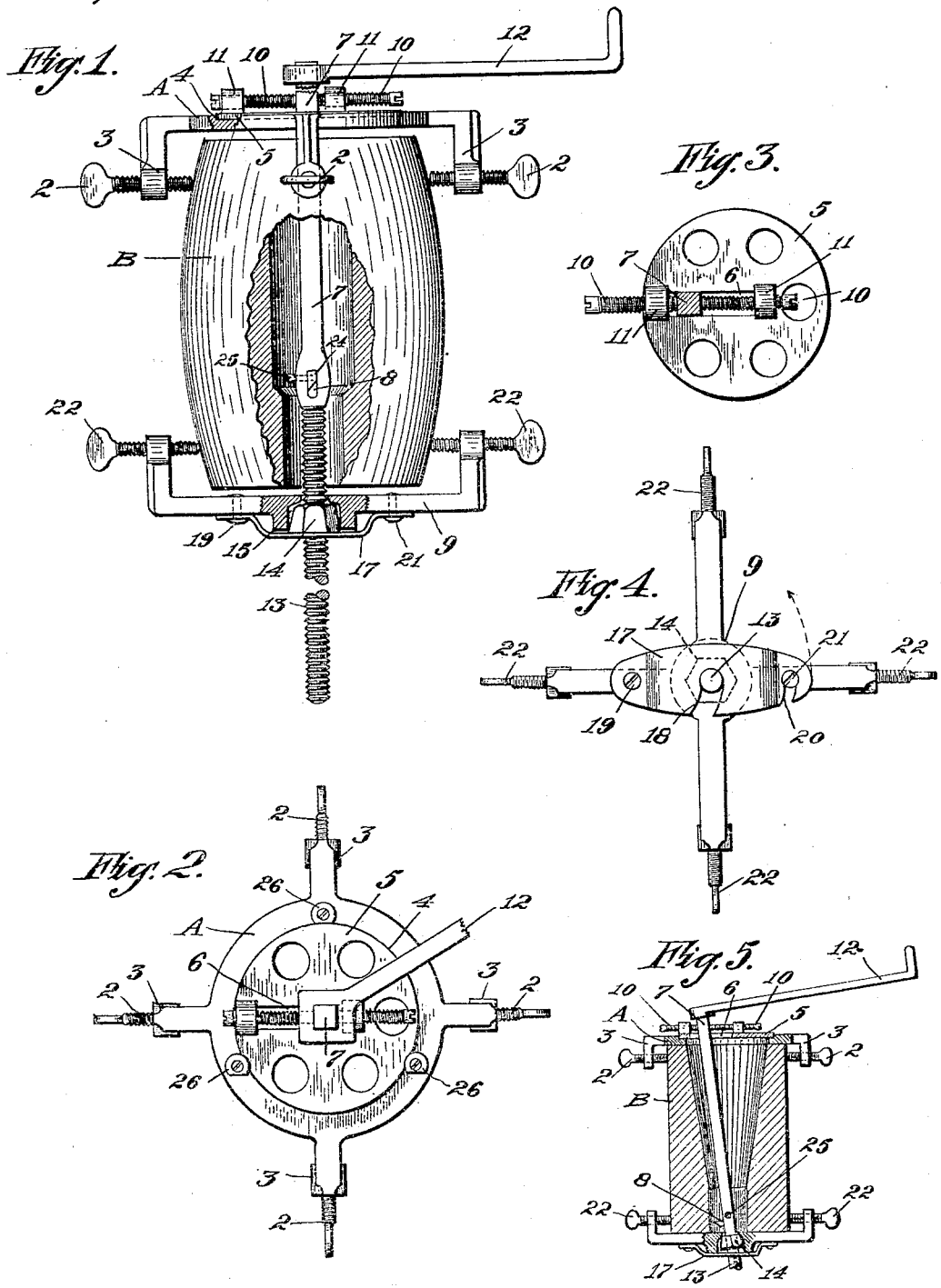

RUDOLF R. KUSS, OF DE LAMAR, IDAHO.

TAPER-BORING MACHINE.

962,848.  Specification of Letters Patent.  Patented June 28, 1910.

Application filed May 18, 1909. Serial No. 496,792.

*To all whom it may concern:*

Be it known that I, RUDOLF R. KUSS, citizen of the United States, residing at De Lamar, in the county of Owyhee and State of Idaho, have invented new and useful Improvements in Taper-Boring Machines, of which the following is a specification.

This invention relates to a taper boring machine.

The object of this invention is to provide a simple, cheap, practical machine which will bore either a straight or a tapered hole; or a partly straight and partly tapered hole; or the reverse; and is particularly designed for use in setting axle boxes on hubs.

The invention consists of the parts and the construction and combination of parts as hereinafter more fully described and claimed, having reference to the accompanying drawings, in which—

Figure 1 is a side elevation of the invention with parts broken away. Fig. 2 is a plan view. Fig. 3 is a plan view of the revoluble disk, showing the stem eccentrically adjusted. Fig. 4 is an inverted plan view. Fig. 5 is a sectional view showing the stem in position for boring a tapered hole.

In the drawings, A is a clamp plate adapted to be clamped and secured to the back face, here represented as the upper face, of the hub shown at B, by means of thumb-screws 2 mounted in downwardly projecting threaded members 3 on the clamp plate A. The body of this clamp plate A is in the form of a ring, and has an annular groove or channel 4 on its inner periphery, in which the disk 5 is mounted to turn. The disk 5 has a diametral slot 6 to receive the upper portion of the stem 7 which carries the adjustable cutting bit 8. The opposite end of the stem is pivotally mounted in a bottom plate 9 secured to the opposite end of the hub.

10 are adjustment screws mounted on posts 11 on the disk 5, by which the position of the stem 7 in the slot 6 may be regulated, so that the stem 7 may be supported at an incline to the hub and made to move in the plane of a cone, as shown in Fig. 5, or to stand parallel or concentric with the hub axis, as in Fig. 1; all as will be more fully described later.

The upper portion of the stem 7 is rectangular in cross-section, and is provided at its outer extremity with a handle or crank 12. The lower portion of the stem 7 is threaded, as at 13, to engage with a correspondingly threaded nut 14 and to allow for adjustment to different lengths of hub. This nut 14 is of hexagonal form and tapered in such manner as to allow eccentric motion of the stem 7 without binding in the socket 15 of the lower clamp plate 9; the nut 14 fitting in a corresponding socket in plate 9 and held against rotation. A guard plate 17 is provided on the plate 9 to retain the nut 14 in place, and is cut away at 18 to allow the portion 13 of the stem to feed through. Plate 17 is pivoted to plate 9 at one end, at 19, so that access may be had to the nut 14. A slot 20 on the outer end of the plate 17 is adapted to engage with a pin 21 to retain it in its closed position. The clamp plate 9 is provided with thumb-screws 22 by which it is rigidly secured to the under side of the hub B.

A knife blade or bit 8 is adjustably mounted in the stem 7 at a point adjacent to the threaded portion 13. This blade or bit may be of any suitable construction, but is here shown as consisting of the style of blade used in the ordinary extension bit, and is held in position in the stem 7 by means of a wedge 24 and tapered screw 25, and is adapted to be adjusted so that any desired length of projection beyond the face of the stem 7 can be obtained.

The revoluble disk 5 is retained in place by tap screws and washers 26, the washers being cut on one side to allow the disk 5 to be removed and replaced by loosening the screws and turning the washers 26 to the proper position.

In operation, the hub B is previously bored to permit of the stem 7 being passed therethrough. The clamp 9 is then placed in position on the lower side of the hub, and the stem 7 inserted therein and through the bore and screwed into the nut 14. The knife blade or cutter 8 is then adjusted on the stem 7, with a portion projecting beyond the face of the stem a distance depending on the width or character of the desired cut. The clamp plate A is then placed over the upper end of the stem 7, which latter is inserted through the slot 6 in the disk 5; disk 5 being retained in and carried by plate A which is adjusted to the proper position on, and secured to the hub B. The stem 7 is then adjusted in the disk 5 by means of the set screws 10, and the crank 12 then placed thereon. If it is desired simply to enlarge the cylindrical bore previously cut, the stem 7 is adjusted centrally of the disk 5, and the blade 8 projected the required length and locked. By rotating the crank 12, the stem 7 will be revolved and turned in the nut 14 in such manner as to give a downward pull to the knife 8, thus causing the latter to ream out the inside of the hub. In this manner the required width and depth of straight bore can be obtained. If it is desired to cut a tapered bore, the stem 7 is set eccentric in the disk 5, as shown in Fig. 5, by loosening one set screw 10 and tightening the other. When this is done, the disk 5 and stem 7 can be revolved by rotating the crank 12, whereupon the stem will be given a gyratory motion about the feed nut as a pivot. The socket bearing 15 of the nut 14 allows the stem 7 and disk 5 to be rotated freely. The wide radius of swing given to the stem 7 at the disk 5, together with the downward pull toward a central point in the socket 15, causes the knife 8 to travel downward with a gradually decreasing radius, in such manner that the bore will be tapered, as shown in Fig. 5. The set screws 10 must be sufficiently tight in their contact with the stem 7, so that there will be no lost motion, but should be loose enough to let the stem slide in and out freely. The feed is made automatic by the nut 14.

From the foregoing it will be seen that by adjusting the set screws 10 in the revolving disk with the stem in the center, a straight hole will be cut; by adjusting them so that the upper end of the stem is off center, a tapered hole will be cut.

The revolving disk or turntable, with the above adjustments, constitute the essential features of the invention.

This machine is small, inexpensive, and extremely handy to shops.

While I have shown the application of the invention to the cutting of hubs, it is manifest that it is capable of use for various other purposes.

Having thus described my invention, what I claim and desire to secure by Letters Patent is—

1. In a taper boring machine, the combination of a feed screw, a cutting member carried by the feed screw, a feed nut, with a suitable support for the latter engaged by the feed screw, a rotatably mounted disk with a suitable support therefor, through which disk the other end of the feed screw passes, and posts projecting from the disk, and adjustment screws mounted on the posts, said disk having a diametral slot and the upper end of the feed screw passing through said slot and being interposed between the adjustment screws whereby said feed screw may be operatively supported at different angles.

2. A taper boring machine comprising a pair of adjustable clamp members, one of which carries a polygonal tapering nut, with means for preventing the nut from turning but permitting it to rock in its support, a feed screw engaging the nut, a cutting member carried by the feed screw, the other clamping plate having a radially slotted disk rotatably supported thereon, posts projecting from the disk, adjustment screws mounted on the posts and engaging opposite sides of the upper end of the feed screw whereby said screw may be operatively supported at different angles, means for rotating the feed screw, and a guard plate below the nut and embracing the feed screw and retaining the nut in place.

3. A taper boring machine comprising a pair of adjustable clamp members, one of which carries a polygonal nut, with means for preventing the nut from turning but permitting it to rock in its support, a feed screw engaging the nut, a cutting member carried by the feed screw, the other clamping plate having a radially slotted disk rotatably supported thereon, said disk engageable with the free end of the feed screw, means for rotating the feed screw, said means for supporting the feed screw in the disk comprising opposed screw-threaded members operative in the line with the slot, and a guard plate underlying the nut and retaining the same in place, said guard plate being pivotally mounted at one end whereby it may be swung to one side to give access to the nut.

In testimony whereof I have hereunto set my hand in presence of two subscribing witnesses.

RUDOLF R. KUSS.

Witnesses:
 ARCHIE BRAMHALL,
 KARL S. TWITCHELL.